(12) United States Patent
Foreman et al.

(10) Patent No.: US 10,055,532 B2
(45) Date of Patent: Aug. 21, 2018

(54) COLLAPSING TERMS IN STATISTICAL STATIC TIMING ANALYSIS

(71) Applicant: International Business Machines Corporation, Armonk, NY (US)

(72) Inventors: Eric A. Foreman, Fairfax, VT (US); Jeffrey G. Hemmett, St. George, VT (US); Chandramouli Visweswariah, Croton-on-Hudson, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 14/666,857

(22) Filed: Mar. 24, 2015

(65) Prior Publication Data

US 2016/0283640 A1  Sep. 29, 2016

(51) Int. Cl.
*G06F 9/455* (2018.01)
*G06F 17/50* (2006.01)

(52) U.S. Cl.
CPC ...... *G06F 17/5081* (2013.01); *G06F 17/5031* (2013.01); *G06F 2217/84* (2013.01)

(58) Field of Classification Search
USPC ........................................................ 716/113
See application file for complete search history.

(56) References Cited

U.S. PATENT DOCUMENTS

| | | | |
|---|---|---|---|
| 6,990,645 B2 | 1/2006 | Lichtensteiger et al. | |
| 7,237,212 B2 | 6/2007 | Kucukcakar et al. | |
| 7,350,171 B2 | 3/2008 | Zhang et al. | |
| 7,689,954 B2 | 3/2010 | Zhang et al. | |
| 8,015,525 B2 | 9/2011 | Chang et al. | |
| 8,302,047 B2 | 10/2012 | Buss et al. | |
| 8,560,989 B2 | 10/2013 | Buck et al. | |
| 8,615,725 B1 | 12/2013 | Keller et al. | |
| 8,683,409 B2 | 3/2014 | Hemmett et al. | |
| 8,775,988 B2 | 7/2014 | Lavin et al. | |
| 8,843,864 B2 | 9/2014 | Le et al. | |
| 2012/0117527 A1* | 5/2012 | Hemmett .............. | G06F 17/504 716/113 |

OTHER PUBLICATIONS

Abbaspour et al., "Efficient Variational Interconnect Modeling for Statistical Timing Analysis by Combined Sensitivity Analysis and Model-Order Reduction", provided by inventor in Main Idea of Disclosure dated Apr. 18, 2014.

Wang, Wei-Shen, "Models and Algorithms for Statistical Timing and Power Analysis of Digital Integrated Circuits", Dissertation, The University of Texas at Austin, May 2007.

(Continued)

*Primary Examiner* — Eric Lee
(74) *Attorney, Agent, or Firm* — Steven J. Meyers; Hoffman Warnick LLC

(57) ABSTRACT

Statistically modeling timing in a digital circuit through the use of canonical form models, where some terms of the form represent sources of variation sensitive to only a subset of timing regions of the circuit. When propagating the form through regions through which some set of terms in the model is not sensitive, those terms are collapsed by placing them in a cache and replacing them in the form with a single combined term that references the cached terms.

20 Claims, 6 Drawing Sheets

(56) References Cited

OTHER PUBLICATIONS

Xie et al., "Robust Estimation of Timing Yield With Partial Statistical Information on Process Variations", 9th International Symposium on Quality Electronic Design, DOI 10.1109/ISQED.2008.104, IEEE Computer Society, pp. 156-161.
"Extreme DA Delivers Accelerated Timing Sign-off for 28-nm Process Technology in TSMC Reference Flow 12.0", Jun. 2, 2011, Santa Clara, CA—Business Wire, pp. 1-3.
"Static timing analysis", Wikipedia, the free encyclopedia, page last modified on Feb. 12, 2015, at 20:58, <http://en.wikipedia.org/wiki/Static_timing_analysis>.
"Statistical static timing analysis", Wikipedia, the free encyclopedia, page last modified on Feb. 20, 2014, at 3:30, <http://en.wikipedia.org/wiki/Statistical_static_timing_analysis>.

* cited by examiner

250

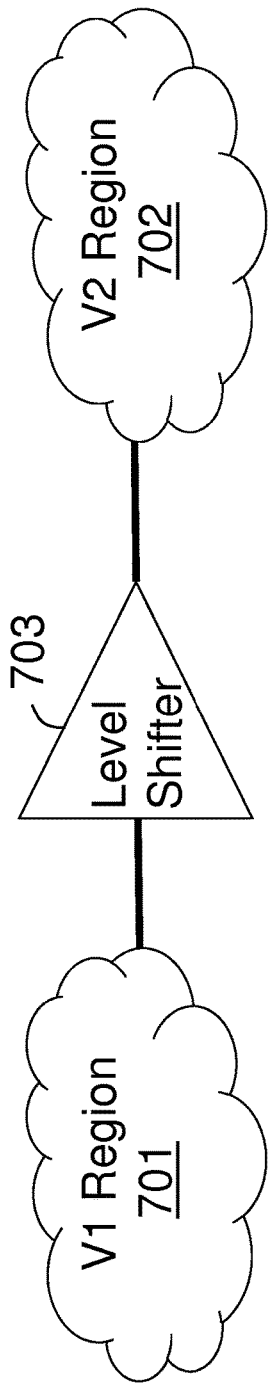

800a: $a_0 + a_X \Delta X + a_Y \Delta Y + a_{V_1} \Delta V_1 + a_{V_1,X} \Delta V_1 \Delta X + a_{V_1,Y} \Delta V_1 \Delta Y + \cdots$ $\underbrace{\phantom{a_{V_1} \Delta V_1 + a_{V_1,X} \Delta V_1 \Delta X + a_{V_1,Y} \Delta V_1 \Delta Y}}_{801}$ 800b: $a_0 + a_X \Delta X + a_Y \Delta Y + b_{V_1} \Delta V_1 + \cdots$ $\underbrace{\phantom{b_{V_1} \Delta V_1}}_{811}$ 800c: $a_0 + a_X \Delta X + a_Y \Delta Y + b_{V_1} \Delta V_1 + a_{V_2} \Delta V_2 + a_{V_2,X} \Delta V_2 \Delta X + a_{V_2,Y} \Delta V_2 \Delta Y + \cdots$ $\underbrace{\phantom{a_{V_2} \Delta V_2 + a_{V_2,X} \Delta V_2 \Delta X + a_{V_2,Y} \Delta V_2 \Delta Y}}_{802}$

COLLAPSING TERMS IN STATISTICAL STATIC TIMING ANALYSIS

BACKGROUND OF THE INVENTION

The present invention relates generally to the field of timing analysis for digital circuit design, and more particularly to statistical static timing analysis.

According to Wikipedia (http://en.wikipedia.org/wiki/Static_timing_analysis) as of Feb. 23, 2015: "Static timing analysis (STA) is a method of computing the expected timing of a digital circuit without requiring simulation. . . . Gauging the ability of a circuit to operate at [a] specified speed requires an ability to measure, during the design process, [circuit] delay at numerous steps. . . . Static timing analysis plays a vital role in facilitating the fast and reasonably accurate measurement of circuit timing. . . . It has become a mainstay of design over the last few decades. . . . The time when a signal arrives can vary due to many reasons—the input data may vary, the circuit may perform different operations, the temperature and voltage may change, and there are manufacturing differences in the exact construction of each part. The main goal of static timing analysis is to verify that despite these possible variations, all signals will arrive neither too early nor too late, and hence proper circuit operation can be assured."

Further, according to Wikipedia (the above and http://en.wikipedia.org/wiki/Statistical_static_timing_analysis) as of Feb. 23, 2015: "Statistical static timing analysis (SSTA) is a procedure that is becoming increasingly necessary to handle the complexities of process and environmental variations in integrated circuits." SSTA "replaces the normal deterministic timing of gates and interconnects [in STA] with probability distributions, and gives a distribution of possible circuit outcomes rather than a single outcome. . . . [T]wo main categories of SSTA algorithms [are] path-based and block-based methods. A path-based algorithm sums gate and wire delays on specific paths. . . . A block-based algorithm generates the arrival times (and required) times for each node, working forward (and backward) from the clocked elements."

The distributions of SSTA are typically represented in "canonical models," or "canonical forms," typically defined, at a high level, by the mean of the timing quantity being modeled summed with additional terms for that quantity's statistical sensitivities to various sources of variation. These terms may include linear terms, representing sensitivities based on only a single or first-order parameter, and/or cross-terms, representing sensitivities based on multiple or higher-order parameters. For example, a term for sensitivity due to silicon process, independent of other parameters, is a linear term, whereas a term for sensitivity due to silicon process with respect to OCV (on-chip-variation) is a cross-term. In this example, the cross-term is due to variation attributable to two parameters that exhibit interdependent variability, or "non-separability" (that is, where a sensitivity due to one parameter can be expressed as a non-constant function of some other parameter).

SUMMARY

According to an aspect of the present invention, there is a method, computer program product and/or system for statistically analyzing timing in a digital circuit that performs the following steps (not necessarily in the following order): (i) receives a canonical form representing a timing quantity for a first timing region; (ii) propagates the form through the first timing region; (iii) collapses a first set of terms of the canonical form; (iv) propagates the form through a second timing region; and (v) reports results of the statistical timing analysis to a user. The collapsed first set of terms represents one or more sources of variation sensitive to the first timing region but not sensitive to the second timing region. The collapsing includes placing the first set of terms in a cache and replacing the first set of terms in the canonical form with a single combined term referencing the cached first set of terms.

BRIEF DESCRIPTION OF THE DRAWINGS

FIG. 7 is a diagram showing regions of a third computer chip which can be used as a workpiece for systems according to the present invention; and FIG. 8 is a set of canonical forms used in and/or generated by the third embodiment system.

DETAILED DESCRIPTION

Figure 1:
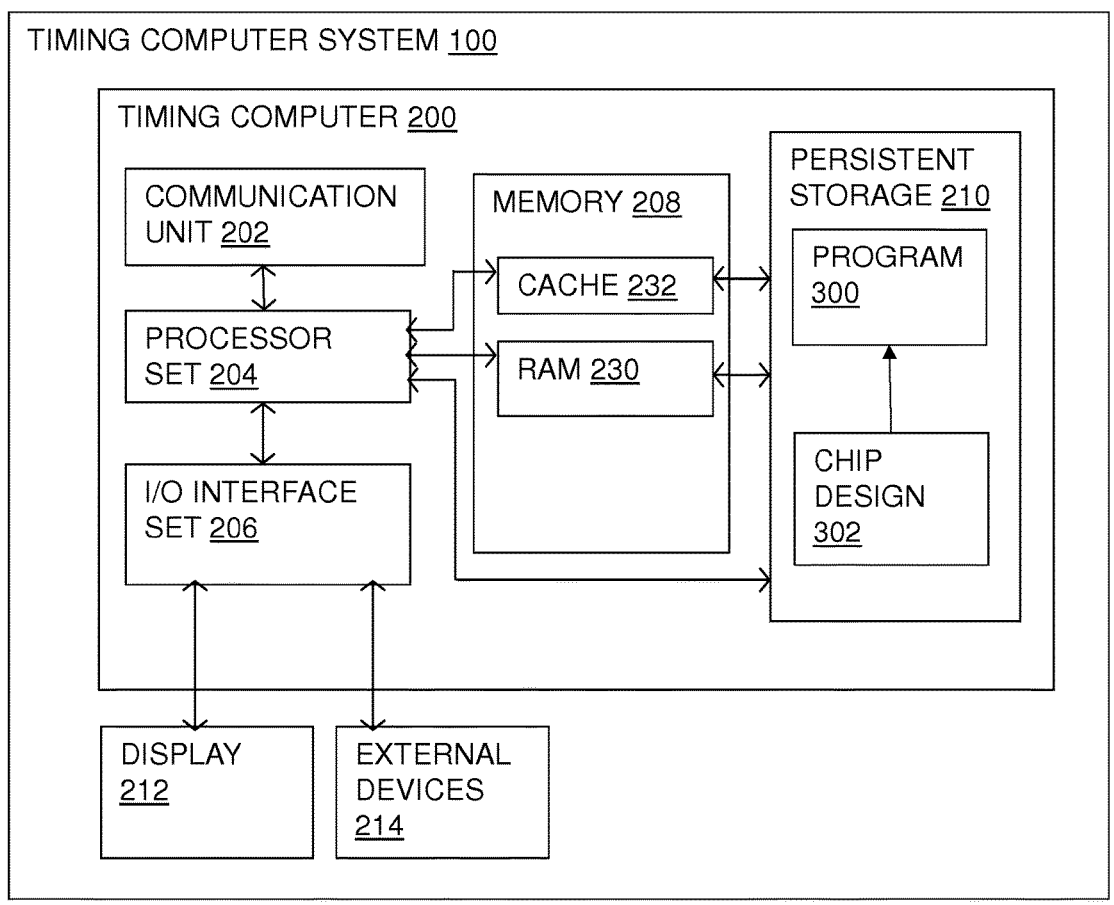
FIG. 1 is a block diagram view of a first embodiment of a system according to the present invention.

Some embodiments of the present invention recognize that some sources of variation in a canonical timing model are local to certain regions, and that terms representing these sources of variation can be collapsed and stored in a cache when propagating the form through other regions. The terms can be unrolled when necessary for certain calculations, when propagating to a region to which the terms are again sensitive, or for reporting needs.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of timing computer system 100, including: timing computer 200; communication unit 202; processor set 204; input/output (I/O) interface set 206; memory device 208; persistent storage device 210; display device 212; external device set 214; random access memory (RAM) devices 230; cache memory device 232; program 300; and chip design 302. Several portions of system 100 will now be discussed in the following paragraphs.

System 100 may be a laptop computer, tablet computer, netbook computer, personal computer (PC), a desktop computer, a personal digital assistant (PDA), a smart phone, or any programmable electronic device. Program 300 is a collection of machine readable instructions and/or data that is used to create, manage and control certain software functions that will be discussed in detail, below, in the Example Embodiment sub-section of this Detailed Description section.

System 100 is capable of communicating with other computer systems, such as via a local area network (LAN), a wide area network (WAN) such as the Internet, or a combination of the two, and can include wired, wireless, or fiber optic connections.

System 100 is shown as a block diagram with many double arrows. These double arrows (no separate reference numerals) represent a communications fabric, which provides communications between various components of system 100. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for system 100; and/or (ii) devices external to system 100 may be able to provide memory for system 100.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to system 100. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with timing computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
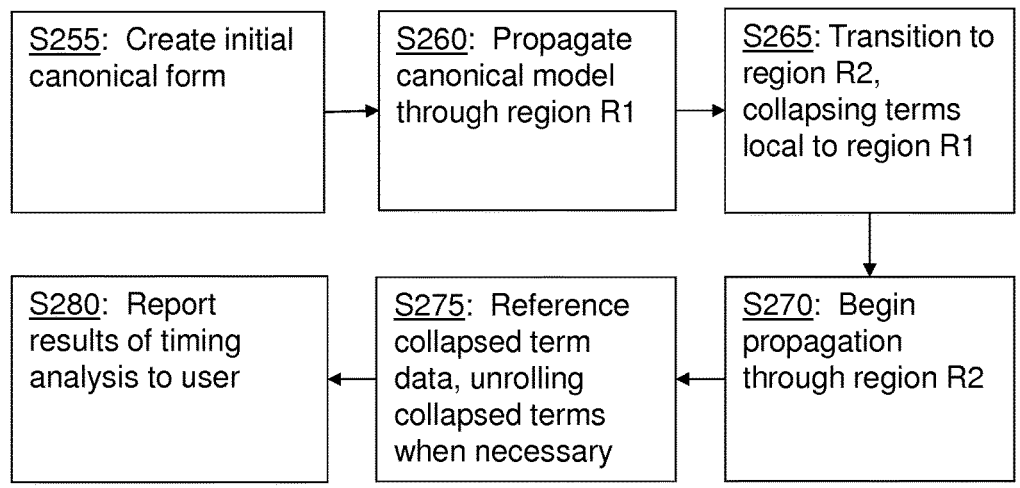
FIG. 2 is a flowchart showing a first embodiment method performed, at least in part, by the first embodiment system.
Figure 3:
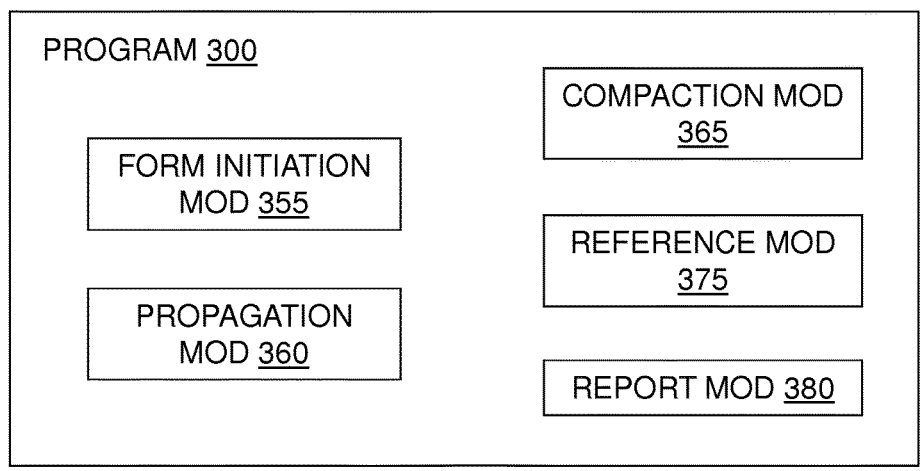
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. The method is for performing a timing analysis of a digital circuit, and program 300 is a timer. This method and associated software will now be discussed, over the course of the following paragraphs, with extensive reference to FIG. 2 (for the method step blocks) and FIG. 3 (for the software blocks).

Processing begins at step S255, where form initiation module ("mod") 355 receives or creates an initial canonical model for the timing analysis to be performed with respect to circuit (chip) design 302 (see FIG. 1). A "canonical form," or "canonical model," is typically a mean summed with terms representing sensitivities to sources of variation. The standard canonical form is a normalized form, where parameter sensitivities are provided in a "per sigma," or "time per unit variation," format so that sensitivities across different types of units (for example, micrometers and millivolts) can be treated in a common fashion and can be compared and combined as needed. The result is a statistical distribution over the parameter space for the timing quantity of interest.

Any timing quantity can be modeled in this way, including gate or wire delay, path delay, arrival time, required arrival time, slack, slew, guard time, assertion, adjust, and so on. Parameters could include voltage, threshold voltage, temperature, metal-layer thickness, line-edge roughness, pattern, chiplet, and many others. Note that both statistical parameters and corner-based parameters can be included in such a model. Statistical parameters include variations that are Gaussian/normal. Parameters such as silicon process, metal process, on-chip variation, and within-chip variation are statistical parameters. Corner-based parameters are non-Gaussian, and include parameters such as temperature and voltage. Deterministic timing refers to non-statistical timing at a particular corner within the process space. For example, "fast" silicon, "high" temperature, and "low" voltage together might define a deterministic corner. Any timing model that can be expressed in canonical form or that incorporates a canonical form or its equivalent may benefit from the teachings described herein, and as such should be considered to be a "canonical form" model for the purposes of this disclosure.

There is not necessarily a single canonical form for a given timing scenario. Rather, the form will depend on the number of parameters being considered and the degree of detail desired or capable of being handled by the resources available for processing. For example, a model that considered only parameter 'X' would include a sensitivity term for 'X'; a model that also considered parameter 'Y' would also include a sensitivity term for 'Y', and might also include a cross-term capturing the interdependent effects of 'X' and 'Y'. There could also be second-order terms of a single parameter ($X^2$), third-order terms capturing the interdependence of three parameters (or of a first-order parameter and a second-order parameter), and so forth. The more terms that are included, the more accurate the model, but also the more resources required to effectively process it. This simple example embodiment will begin with three parameters: X, Vi, and Ti, and the resulting canonical form with first- and second-order terms:

$$a_0 + a_X \Delta X + a_{V_1} \Delta V_1 + a_{T_1} \Delta T_1 + a_{X,V_1} \Delta X \Delta V_1 + a_{X,T_1} \Delta X \Delta T_1 + a_{T_1,V_1} \Delta T_1 \Delta V_1$$

Processing proceeds to step S260, where propagation mod 360 begins propagating the form through the features of circuit 302, building the statistical distribution of the timing parameter of interest based on the features through which the model is propagated. Because there may be many, many features through a circuit path, many, many instances of the above form may be needed to propagate timing along that path (because each feature, such as a gate, has a canonical delay; for example if a path has 100 gates, there would be 100 canonical delays for these gates along that path). Some parameters of the model, however, may only apply with respect to a particular region. That is, their variability is local to only a portion of the circuit. In this example, both (voltage) $V_1$ and (temperature) $T_1$ exhibit this property.

Figure 4:
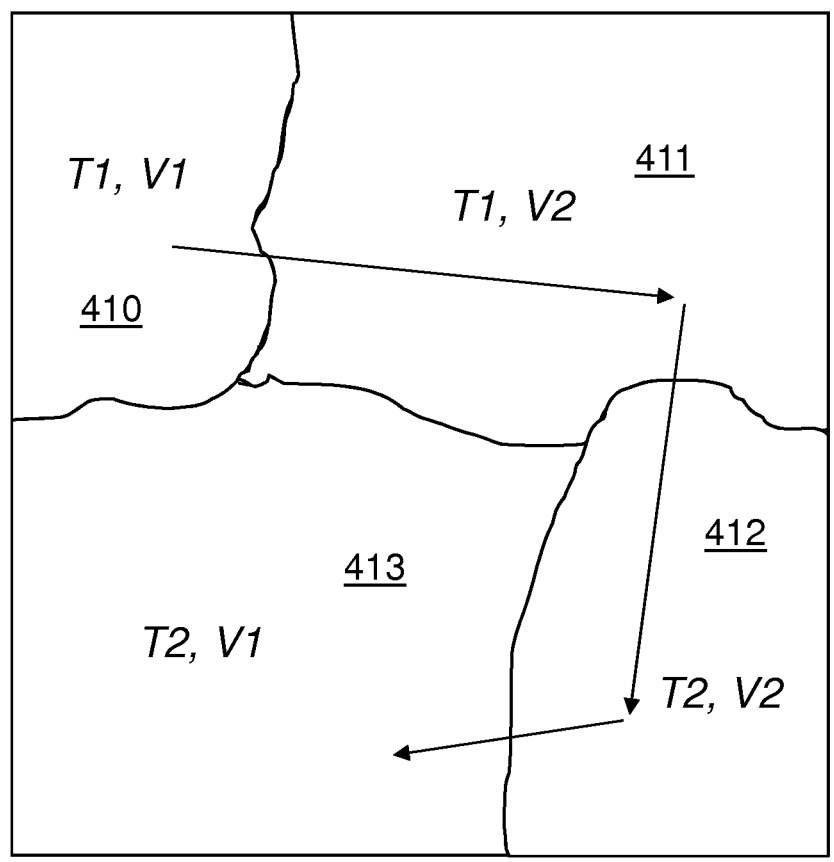
FIG. 4 is a diagram showing regions of a first computer chip which can be used as a workpiece for systems according to the present invention.

Shown in FIG. 4 is chip 400, showing regions 410, 411, 412, and 413 of chip design 302 with respect to voltage and temperature. As can be observed, $V_1$ is local to regions 410 and 413, while $T_1$ is local to regions 410 and 411. Both sets of regions are contiguous here, but in general they need not be. Propagation begins in region 410. As propagation passes from region 410 to region 411, an opportunity for collapsing terms arises. Propagation mod 360 notes this opportunity and calls on compaction mod 365 to take advantage of it.

Processing thus proceeds to step S265, where compaction mod 365 evaluates the canonical model to determine what terms to collapse. In this case, the propagation has moved out of a $V_1$ region, so no $V_1$ terms will vary in the new region. All $V_1$ terms can therefore be collapsed. Collapsing terms involves moving those terms out of the canonical form and into cache 232 (see FIG. 1), replacing the collapsed terms in the model with a single term referencing the terms stored in the cache. The cache may also store other information about the collapsed terms, such as their variance, for quick, convenient reference by reference mod 375 when necessary for performing certain calculations such as min/max calculations or projections. This operation results in the following:

Canonical: $a_0 + a_X \Delta X + b_{V_1} \Delta V_1 + a_{T_1} \Delta T_1 + a_{X,T_1} \Delta X \Delta T_1$ Cached terms: $a_{V_1} \Delta V_1 + a_{X,V_1} \Delta X \Delta V_1 + a_{T_1,V_1} \Delta T_1 \Delta V_1$ where $b_{V_1} \Delta V_1$ is the single term substituted for all the $V_1$-dependent terms. Although cache 232 is used here, the collapsed term cache need not be a physical cache per se, but could in general be any location to which data can be stored and references to that data can be made.

With the collapsing completed, processing proceeds to step S270, where propagation mod 360 continues propagation of the canonical through chip 400 by beginning propagation through region 411. The canonical will accumulate additional terms when propagated through this region, as parameter $V_2$ is now of interest as well. A similar sequence of collapsing and propagating will occur for $T_1$ terms when propagation passes from region 411 to region 412, with terms for $T_2$ then being appended to the model.

Processing proceeds to step S275, where reference mod 375 unrolls the collapsed terms as necessary. In this example, this will happen for $V_1$ terms when propagation reaches region 413, another region of $V_1$ variability, but could also happen in other situations, such as when performing projections without using the stored variance of the collapsed terms. (Cross-terms which include more than one collapsed parameter can remain collapsed unless and until terms for all their included parameters are unrolled, though transitional adjustments may have to be made. Here, for instance, $a_{T_1,V_1} \Delta T_1 \Delta V_1$ is initially cached with $V_1$ terms, but can remain cached with $T_1$ terms throughout the remainder of the analysis because after leaving region 410, propagation never returns to an area of simultaneous $T_1$ and $V_1$ variability. An adjustment to the cache and/or cache references may have to be made to account for this change of association, but ultimately, if no variation is being modeled at a gate, terms representing that variation can be cached.) Collapsing and unrolling may be repeated multiple times for a given set of terms, for example as propagation alternately moves into and out of regions affecting a given variational parameter, or as terms are unrolled temporarily as needed to perform certain calculations such as statistical min/max.

Processing proceeds to step S280, where, upon completion of the timing analysis, report mod 380 provides a report of the analysis to a user. The user may be, for example, a designer, or it may be a design program capable of automatically making certain adjustments to chip design 302 in response to the timing analysis results. Because terms with local variability are reversibly collapsed rather than being discarded or only included in parts of the analysis, they are retained and included in a final, comprehensive report that covers the full parameter space of the model, and they remain available for scrutiny by the user. Alternatively or in addition, use of the collapsing technique described herein permits a more detailed and accurate model to be employed, having more parameters and more terms than what could be included in the model otherwise.

III. Further Comments and/or Embodiments

Some embodiments of the present invention recognize that modeling timing quantities for digital circuits is a growing problem. As such circuits become more complex, the complexity of signal delay and slew variability grows as well, in turn requiring models having ever larger numbers of variational parameters and second-order terms to achieve sufficient timing accuracy. Some of the factors giving rise to increased circuit complexity include the use of: (i) multiple voltage rails (voltage sources); (ii) multiple voltage islands (areas with voltage regimes different from those elsewhere in a circuit); (iii) multiple transistor threshold-voltage (Vt) families; (iv) multiple layers of interconnect; (iv) multi-patterning (such as used to create very closely spaced wire features on a die); and (v) three-dimensional (3D) chip modules, where each slice, or chiplet, of a module introduces variability that is uncorrelated or only partially correlated with the variability of other levels, so each chiplet requires its own set of variational parameters.

Some embodiments of the present invention recognize that a result of this growing complexity is that each parameter—such as voltage or temperature—requires many cross-terms to model its effect on the variability of other parameters. As a simple example, a timing model with 3 parameters—$VDD_1$, X, and Y—might have 2 second-order cross-terms to account for interactions between $VDD_1$ and each of the two other parameters, such as in the following canonical expression:

$$a_0 + a_{VDD_1} \Delta VDD_1 + a_X \Delta X + a_Y \Delta Y + a_{VDD_1,X} \Delta VDD_1 \Delta X + a_{VDD_1,Y} \Delta VDD_1 \Delta Y + \ldots$$

In this expression, the first term represents the average (mean) of the timing quantity being modeled, the next three terms represent the variabilities (sensitivities) due to parameters $VDD_1$, X, and Y, respectively, the next two terms represent the variabilities due to the interactions of $VDD_1$ and each of the other two terms, and so on.

Consequently, some embodiments of the present invention recognize: (i) that long canonical forms of timing quantities, such as arrival times (ATs) or required arrival times (RATs), are expensive in memory, in run time, or both; (ii) that performing statistical static timing analysis (SSTA) with all parameters and cross-terms required for obtaining sufficient accuracy is too expensive in memory and/or run time; (iii) that reducing the number of parameters modeled by either ignoring them or including them only in early/late splits (limit-case models) increases inaccuracy and/or increases pessimism (whereby modeled performance understates actual performance); (iv) that performing multiple SSTA runs with some parameters fixed to corner values (extremes)—for example, fixed supply voltages of voltage islands—is too expensive for designers and/or too expensive in run time; and/or (v) that reduction of memory footprint and/or run time is therefore one of the most important problems in timing analysis.

Furthermore, some embodiments of the present invention recognize that many sources of variation are local to chip regions, chiplets of 3D chip modules, and/or circuit macros (for example, a piece of circuit intellectual property instantiated in a design by some sort of "black box" or abstracted delay model—it may be a complex circuit containing thousands of gates). These sources include: (i) voltage islands; (ii) sets of parameters affecting 3D stack modules (chiplets); (iii) temperature regions of central processing unit (CPU) cores, graphics processing units (GPUs), digital signal processing (DSP) components, and so on depending on their workload; and (iv) high-performance and/or low-power macros constructed from different Vt families.

Still further, some embodiments of the present invention recognize that: (i) signals crossing multiple regions (chiplets) accumulate in their timing quantities (such as ATs/RATs) the variability of many parameters and their cross-terms; (ii) that these signals are too expensive to model; (iii) that modeling signals that are local to regions of similar variability, however, is not very expensive, because their timing quantities (such as ATs/RATs) depend only on local parameters; and/or (iv) that the length of canonical forms can therefore be reduced by exploiting the locality of some variations, collapsing parts of canonical forms to produce more efficient models.

Figure 5:
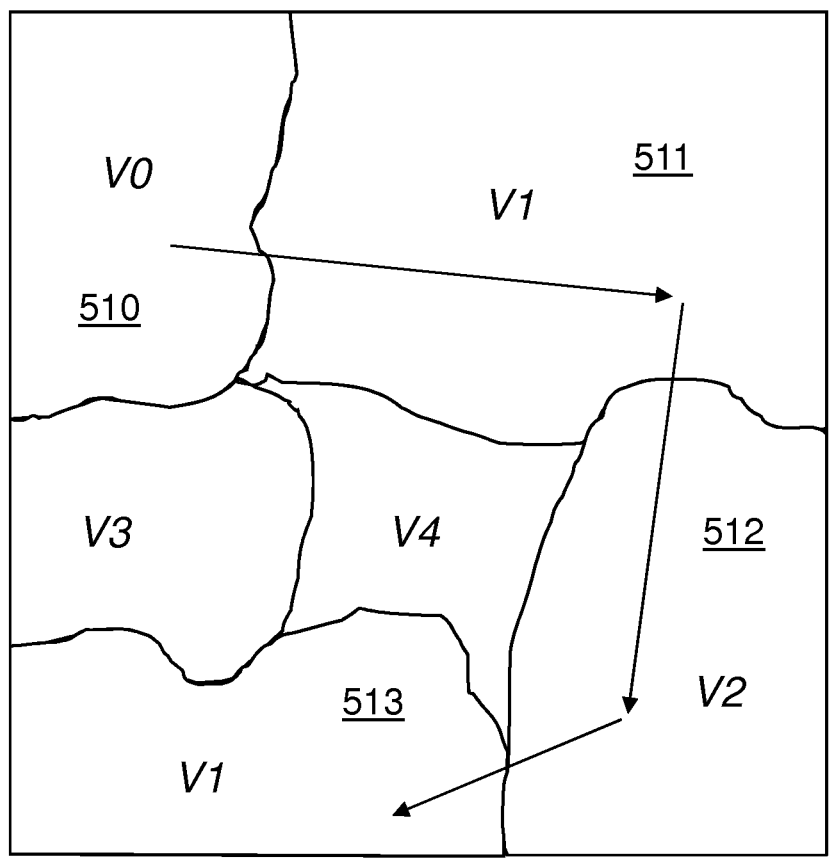
FIG. 5 is a diagram showing regions of a second computer chip which can be used as a workpiece for systems according to the present invention.

For example, consider chip 500 of FIG. 5. Chip 500 is made up of regions of various voltages, $V_0$ to $V_4$, as shown, including regions 510, 511, 512, and 513. Suppose it is desired to determine a timing quantity (AT, RAT, delay, slew, etc.) of a signal that propagates across chip 500 from $V_0$ region 510 to $V_1$ region 511, $V_2$ region 512, then back to a $V_1$ region, region 513. As a canonical form for the timing quantity is propagated through these several regions, it accumulates subsequences of each region variability—Vdd and Temperature and their cross-terms, for instance (AT/RAT propagation requires only variability of the current region, as delay and slews depend only on local parameters).

Figure 6:
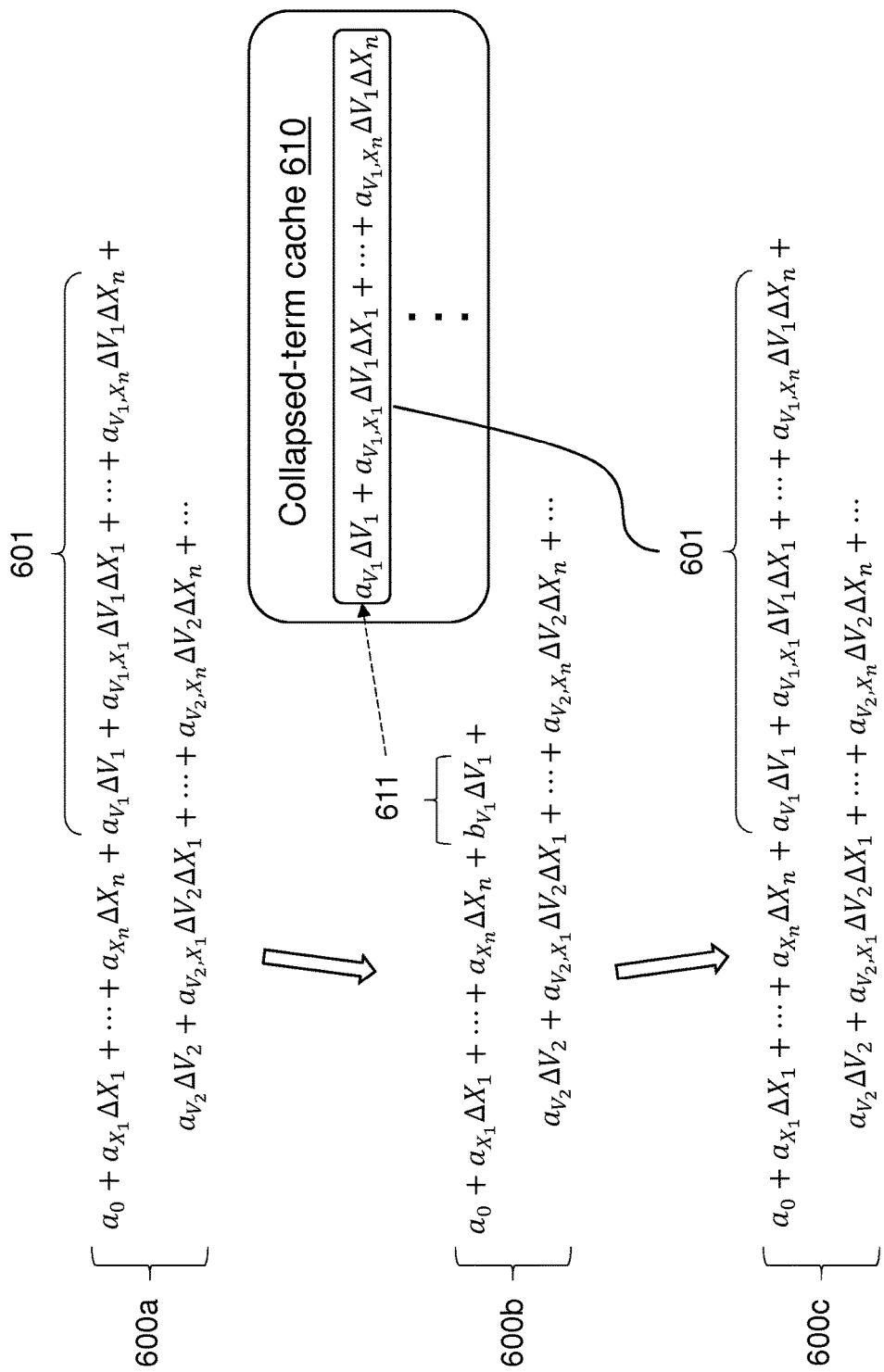
FIG. 6 is a set of canonical forms used in and/or generated by the second embodiment system.

Canonical form 600a of FIG. 6 shows what the canonical form looks like for this analysis as the propagation enters $V_2$ region 512. Among the terms accumulated in the canonical form at this point are those represented by subsequence 601, corresponding to all the terms (linear terms with cross-terms) involving parameter $V_1$. Because the terms in this subsequence are not related to the current region ($V_2$ region 512) and are not affected by propagation through this region, subsequence 601 of canonical form 600a is collapsed into a single variable, represented by term 611 of canonical form 600b. Term 611 acts as a reference to the collapsed terms (subsequence 601), which are stored in cache 610 with precomputed values to help in min/max function computations. The variance (a measure of statistical dispersion) of the collapsed terms is also stored in cache 610, for use in projections and slew chain-ruling. The collapsed terms are unrolled only when needed, such as for min/max functions, slack projections, and so on, or when propagating to a region to which these terms are again related, such as $V_1$ region 513. Unrolling is illustrated by canonical form 600c.

("Min" and "max" are functions that use canonical forms as input. For a 2-input AND gate, for example, which input is the max may need to be determined. For non-statistical scenarios this is easy as it is just the larger of the two. For statistical scenarios, a statistical max is performed (or a min, if needed to see which comes earlier). For a max calculation, all components of a canonical form are needed. Variance is the square of standard deviation, or the sensitivity squared. Slew chain-ruling is another calculation method that uses canonical inputs. It makes sure that the correct input slew to a circuit accounts for all of the variation. Projection is a technique that combines all the terms in the canonical form to create a single value. An example would be to take the delay canonical and combine it to show the fastest corner in the parameter space.)

Shown in FIG. 7 is a second example of canonical collapsing. In this example, the canonical form is propagated from $V_1$ region 701 through level shifter 703 to $V_2$ region 702. $V_1$ and $V_2$ are region variables (parameters with variability in only a certain region), while X and Y are common set variables (parameters with global variability; for instance, X could be "silicon process" and Y could be "temperature"). The canonical form is first propagated through region 701 to determine, say, AT and slew effects of this region.

Shown in FIG. 8 are canonical forms 800a-c. Canonical form 800a, which includes $V_1$ terms 801, is used for the calculations just described for the circuit of FIG. 7. Propagation then passes through (voltage) level shifter 703 before moving on to $V_2$ region 702. Once cross-terms of X and Y with respect to voltage are created, then those cross-terms are only sensitive to their respective voltage region. As $V_1$ is not a parameter in region 702, $V_1$ terms 801 are collapsed into single reference term 811, giving form 800b. Finally, as the form is propagated through $V_2$ region 702, $V_2$ terms 802 are appended to the form, while $V_1$ terms 801 remain collapsed during this portion of the analysis.

In some embodiments of the present invention, when propagation of a canonical form of a timing quantity goes from a region $R_1$ with voltage $V_1$ into a region $R_2$ with voltage $V_2$: (i) all voltage terms (linear and cross-terms) related (only) to region $R_1$ are collapsed into a single combined variation ($b_{V1} \cdot \Delta V1$, for example); (ii) the actual collapsed sequence of terms is stored in a special cache; (iii) the sensitivity (single combined term) has a reference to that sequence; and/or (iv) variance and/or other general characteristics of the collapsed sequence are preserved for use in projections or slew chain-ruling. As the canonical waveform continues to propagate through gates in region $R_2$, finite differencing is only performed relative to the voltage of the current region (voltage $V_2$)—the collapsed term does not need to be expanded or modified. Sensitivity to combined variability is propagated by chain ruling of signal slews.

The collapsed sequence may be expanded again in certain situations. For instance: (i) statistical min/max: if a statistical min/max calculation is required, the collapsed subsequence of variations is unrolled (restored), the statistical min/max operation is performed, and the resulting subsequence of variations is collapsed again; (ii) propagation returns to a region with voltage $V_1$: the collapsed variations due to $V_1$ are restored, to be used during propagation in this new region; (iii) projections: can be done either by (a) unrolling the collapsed terms or (b) projecting the collapsed terms as a single entity using the stored variance of the collapsed terms.

In some embodiments of the present invention, the collapsing/expanding technique described above: (i) is applicable to any parameter(s) expressing local variability; (ii) is highly flexible and capable of being adapted to different voltage designs; (iii) is simple to use and transparent to designers performing timing analyses; (iv) is simple to implement and does not require significant changes to the timer (timing analysis program); and/or (v) improves runtime and memory requirements without loss of accuracy, for example as compared to using long canonical forms or multiple timing runs, because, for instance, (a) collapsed canonical forms are much shorter than the corresponding original, uncollapsed forms, (b) propagation of the shorter collapsed forms requires less CPU time, (c) min/max operations (requiring form expansion) in global signal paths are rare, and/or (d) path-based timing does not use min/max operations during propagation.

In addition, in some embodiments of the present invention, the collapsing/expanding technique described above: (i) improves accuracy of slew propagation by propagating chain rule coefficients; (ii) improves accuracy by modeling all second order terms, for example as compared to ignoring some variations or including them (only) in early/late splits; (iii) permits accurate modeling of voltage/temperature variability across a chip by, for example, (a) capturing individual characteristics of voltage islands and/or temperature variability in regions with correlated temperature variations, and/or (b) modeling interaction of voltage/temperature variability with other variations (cross-terms of voltage, temperature and process variations of different Vt families); and/or (iv) accurately models sets of variational parameters of 3D module chiplets.

Embodiments of the present invention may be useful in one or more of the following application areas: (i) timing chips with multiple voltage islands; (ii) 3D stack modules comprising multiple chiplets, where process variations of different chiplets are not correlated and require different sets of statistical variables; (iii) modeling across chip variations of temperature variability by identifying regions of chips with different characteristics of temperature variability, such as CPU, GPU, and DSP cores, memory caches, and other areas and modeling temperature variation of each region with an individual temperature variable; (iv) timing global signal propagation paths crossing multiple regions (chiplets), where a small amount of branching or convergence makes the method efficient; (v) path-based timing of signals crossing multiple regions (chiplets), without restrictions on branching and convergence (may be particularly helpful for Common Path Pessimism Removal (CPPR) and path-based timers, including the path-based algorithms used by many STA tools; and/or (vi) timing of signal propagation paths going through different metal layers.

Some embodiments of the present invention may include one, or more, of the following features, characteristics and/or advantages: (i) deal with canonical forms and/or paths and canonical forms; (ii) recognize regions of variability, having different canonicals in different regions, and intelligently combining canonicals from different regions; (iii) collapse the canonical; (iv) collapse subsequences of canonical form terms; (v) collapse a canonical model in statistical static timing analysis; (vi) unroll collapsed canonicals for efficient min/max calculations; (vii) break a parameter apart into statistical and non-statistical components; (viii) report (statistical) results; and/or (ix) break voltage up into parts and include in a statistical reporting algorithm.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for analyzing and adjusting a chip under analysis through statistical timing analysis, the method being performed with a computing device for generating a modified chip design for the chip under analysis, the method comprising:
   receiving a canonical form representing a timing quantity for a first timing region of the chip;
   propagating the canonical form through the first timing region of the chip;
   collapsing a first set of terms of the canonical form;
   propagating the canonical form having the collapsed first set of terms through a second timing region of the chip;
   determining results of the statistical timing analysis;
   wherein:
      the collapsed first set of terms corresponds to one or more sources of variation sensitive to, and present within, the first timing region of the chip but absent from, and not sensitive to, the second timing region of the chip, wherein the one or more sources of variation includes a specification voltage of the chip; and
      the collapsing involves placing the first set of terms in a cache and replacing the first set of terms in the canonical form with a single combined term using the collapsed first set of terms, and referencing the cached first set of terms;
   automatically generating, in a design program communicatively connected to the computing device, a modified operating specification for the chip under analysis, based on the results of the statistical timing analysis; and
   adjusting the chip to include the modified operating specification, wherein the modified operating specification causes the chip to operate with a voltage different from the specification voltage.

2. The method of claim 1 further comprising:
   unrolling the collapsed first set of terms by replacing the single combined term in the canonical form with the first set of terms.

3. The method of claim 2 further comprising:
   using the unrolled first set of terms to perform a statistical min/max calculation or a projection; and
   re-collapsing the unrolled first set of terms.

4. The method of claim 2 further comprising: propagating the canonical form through a third timing region; wherein:
   the unrolled first set of terms corresponds to one or more sources of variation sensitive to, and present within, the third timing region but absent from, and not sensitive to, the second timing region.

5. The method of claim 1 wherein:
   the collapsing includes storing in the cache a measure of statistical dispersion for one or more of the collapsed first set of terms.

6. The method of claim 1 wherein:
   the one or more sources of variation included within the first timing region of the chip includes a component having a specification voltage different from the specification voltage of the chip.

7. The method of claim 1, further comprising reporting results of the statistical timing analysis to the user, wherein the reporting covers a full parameter space represented by every term that appears in the canonical form at any point during the statistical timing analysis.

8. The method of claim 1 wherein:
   the method forms at least part of a path-based statistical static timing analysis algorithm.

9. A computer program product for analyzing and adjusting a chip under analysis through statistical timing analysis to generate a modified chip design for the chip under analysis, the computer program product comprising a computer readable storage medium having stored thereon:
   first program instructions programmed to receive a canonical form representing a timing quantity for a first timing region of the chip;
   second program instructions programmed to propagate the canonical form through the first timing region of the chip;
   third program instructions programmed to collapse a first set of terms of the canonical form;
   fourth program instructions programmed to propagate the canonical form having the collapsed first set of terms through a second timing region of the chip;
   fifth program instructions programmed to determine results of the statistical timing analysis;
   wherein:
   the collapsed first set of terms corresponds to one or more sources of variation sensitive to, and present within, the first timing region of the chip but absent from, and not sensitive to, the second timing region of the chip, wherein the one or more sources of variation includes a specification voltage of the chip; and
   the collapsing involves placing the first set of terms in a cache and replacing the first set of terms in the canonical form with a single combined term using the collapsed first set of terms, and referencing the cached first set of terms;
   sixth program code for causing a design program communicatively connected to the computer program product to automatically generate a modified operating specification for the chip under analysis, based on the results of the statistical timing analysis; and
   adjusting the chip to include the modified operating specification, wherein the modified operating specification causes the chip to operate with a voltage different from the specification voltage.

10. The product of claim 9 further comprising:
    seventh program instructions programmed to unroll the collapsed first set of terms by replacing the single combined term in the canonical form with the first set of terms.

11. The product of claim 10 further comprising:
    eighth program instructions programmed to use the unrolled first set of terms to perform a statistical min/max calculation or a projection; and
    ninth program instructions programmed to re-collapse the unrolled first set of terms.

12. The product of claim 10 further comprising:
    eighth program instructions programmed to propagate the canonical form through a third timing region;
    wherein:
    the unrolled first set of terms corresponds to one or more sources of variation sensitive to, and present within, the third timing region of the chip but absent from, and not sensitive to, the second timing region of the chip.

13. The product of claim 9 wherein:
    the collapsing includes storing in the cache a measure of statistical dispersion for one or more of the collapsed first set of terms.

14. The product of claim 9 wherein:
the one or more sources of variation included within the first timing region of the chip includes a component having a specification voltage different from the specification voltage of the chip.

15. A computer system for analyzing and adjusting a chip under analysis through statistical timing analysis to generate a modified chip design for the chip under analysis, the computer-modeled chip design having been generated by the computer system, the computer system comprising:
a design program configured to generate circuit designs for the chip under analysis based on instructions;
a processor(s) set; and
a computer readable storage medium;
wherein:
the processor set is structured, located, connected and/or programmed to run program instructions stored on the computer readable storage medium; and
the program instructions include:
first program instructions programmed to receive a canonical form representing a timing quantity for a first timing region of the chip;
second program instructions programmed to propagate the canonical form through the first timing region of the chip;
third program instructions programmed to collapse a first set of terms of the canonical form;
fourth program instructions programmed to propagate the canonical form having the collapsed set of terms through a second timing region of the computer-modeled chip design;
fifth program instructions programmed to determine results of the statistical timing analysis to a user;
wherein:
the collapsed first set of terms corresponds to one or more sources of variation sensitive to, and present within, the first timing region of the chip but absent from, and not sensitive to, the second timing region of the chip, wherein the one or more sources of variation includes a specification voltage of the chip; and
the collapsing involves placing the first set of terms in a cache and replacing the first set of terms in the canonical form with a single combined term using the collapsed first set of terms, and referencing the cached first set of terms;
sixth program instructions for causing the design program to automatically generate a modified operating specification for the chip under analysis, based on the results of the statistical timing analysis; and
adjusting the chip to include the modified operating specification, wherein the modified operating specification causes the chip to operate with a voltage different from the specification voltage.

16. The system of claim 15 wherein the program instructions further include:
seventh program instructions programmed to unroll the collapsed first set of terms by replacing the single combined term in the canonical form with the first set of terms.

17. The system of claim 16 wherein the program instructions further include:
eighth program instructions programmed to use the unrolled first set of terms to perform a statistical min/max calculation or a projection; and
ninth program instructions programmed to re-collapse the unrolled first set of terms.

18. The system of claim 16 wherein the program instructions further include:
eighth program instructions programmed to propagate the canonical form through a third timing region;
wherein:
the unrolled first set of terms corresponds to one or more sources of variation included within, and sensitive to, the third timing region but absent from, and not sensitive to, the second timing region.

19. The system of claim 15 wherein:
the collapsing includes storing in the cache a measure of statistical dispersion for one or more of the collapsed first set of terms.

20. The system of claim 15 wherein:
the one or more sources of variation included within the first timing region of the chip includes a component having a specification voltage different from the specification voltage of the chip.

* * * * *